(12) United States Patent
Pudleiner et al.

(10) Patent No.: US 9,375,968 B2
(45) Date of Patent: Jun. 28, 2016

(54) PLASTIC FILM FOR PRINTING BY DYE DIFFUSION THERMAL TRANSFER PRINTING

(71) Applicant: Bayer Intellectual Property GmbH, Monheim (DE)

(72) Inventors: Heinz Pudleiner, Krefeld (DE); Klaus Meyer, Dormagen (DE); Georgios Tziovaras, Wuppertal (DE); Mehmet-Cengiz Yesildag, Leverkusen (DE); Chung Leung Wong, Hong Kong (CN)

(73) Assignee: Covestro Deutschland AG, Leverkusen (DE)

( * ) Notice: Subject to any disclaimer, the term of this patent is extended or adjusted under 35 U.S.C. 154(b) by 36 days.

(21) Appl. No.: 14/372,503

(22) PCT Filed: Jan. 16, 2013

(86) PCT No.: PCT/EP2013/050750
§ 371 (c)(1),
(2) Date: Jul. 16, 2014

(87) PCT Pub. No.: WO2013/107773
PCT Pub. Date: Jul. 25, 2013

(65) Prior Publication Data
US 2015/0004377 A1 Jan. 1, 2015

(30) Foreign Application Priority Data
Jan. 19, 2012 (EP) ..................... 12151745

(51) Int. Cl.
| | |
|---|---|
| *B41M 5/52* | (2006.01) |
| *B32B 27/08* | (2006.01) |
| *B32B 27/36* | (2006.01) |
| *C08J 5/18* | (2006.01) |
| *C08K 5/524* | (2006.01) |
| *C08K 5/529* | (2006.01) |
| *B32B 27/18* | (2006.01) |
| *B42D 25/00* | (2014.01) |
| *B29C 47/06* | (2006.01) |
| *B41M 5/385* | (2006.01) |
| *B42D 15/00* | (2006.01) |
| *B42D 25/455* | (2014.01) |
| *B29K 67/00* | (2006.01) |
| *B29K 69/00* | (2006.01) |
| *B29L 9/00* | (2006.01) |

(52) U.S. Cl.
CPC ............ *B41M 5/5272* (2013.01); *B29C 47/065* (2013.01); *B32B 27/08* (2013.01); *B32B 27/18* (2013.01); *B32B 27/36* (2013.01); *B32B 27/365* (2013.01); *B41M 5/385* (2013.01); *B41M 5/5218* (2013.01); *B41M 5/5227* (2013.01); *B42D 15/0093* (2013.01); *B42D 25/00* (2014.10); *C08J 5/18* (2013.01); *C08K 5/524* (2013.01); *C08K 5/529* (2013.01); *B29K 2067/003* (2013.01); *B29K 2069/00* (2013.01); *B29L 2009/00* (2013.01); *B32B 2250/02* (2013.01); *B32B 2250/40* (2013.01); *B32B 2425/00* (2013.01); *B41M 2205/02* (2013.01); *B42D 25/455* (2014.10); *B42D 2033/30* (2013.01); *B42D 2035/06* (2013.01); *C08J 2367/02* (2013.01); *Y10T 156/10* (2015.01); *Y10T 428/24802* (2015.01); *Y10T 428/31507* (2015.04); *Y10T 428/31786* (2015.04); *Y10T 428/31797* (2015.04)

(58) Field of Classification Search
CPC ...... B41M 2205/02; B41M 5/50; B41M 5/52; B41M 5/5218; B41M 5/5227; B41M 5/5272; Y10T 428/31786; Y10T 428/31797
USPC .............................. 503/227; 428/480, 48, 483
See application file for complete search history.

(56) References Cited

U.S. PATENT DOCUMENTS

| | | | |
|---|---|---|---|
| 3,209,013 A | 9/1965 | Hechenbleikner et al. | |
| 3,692,744 A | 9/1972 | Rich et al. | |
| 3,794,629 A | 2/1974 | Eimers et al. | |
| 4,176,224 A | 11/1979 | Bier et al. | |
| 4,368,240 A | 1/1983 | Nauta et al. | |
| 5,334,573 A | 8/1994 | Schild | |
| 5,658,846 A | 8/1997 | Slark | |
| 5,928,780 A | 7/1999 | Schmidt et al. | |
| 6,693,657 B2 | 2/2004 | Jones et al. | |
| 6,703,474 B2 * | 3/2004 | Fujimori | C08G 63/78 528/275 |
| 2007/0295689 A1 | 12/2007 | Clauss et al. | |

FOREIGN PATENT DOCUMENTS

| | | | |
|---|---|---|---|
| DE | 1900270 A | 11/1969 | |
| DE | 2140207 A | 2/1973 | |

(Continued)

OTHER PUBLICATIONS

International Search Report for PCT/EP2013/050750 mailed Mar. 4, 2013.

(Continued)

*Primary Examiner* — Bruce H Hess
(74) *Attorney, Agent, or Firm* — Drinker Biddle & Reath LLP

(57) ABSTRACT

The invention relates to a special layer construction and a special film of plastic for the production of such a layer construction which is suitable for printing by means of dye diffusion thermal transfer printing, a process for the production thereof and a security and/or valuable document comprising such a layer construction.

14 Claims, No Drawings

(56) References Cited

FOREIGN PATENT DOCUMENTS

| | | |
|---|---|---|
| DE | 2407674 A1 | 10/1974 |
| DE | 2407776 A1 | 9/1975 |
| DE | 2715932 | 10/1978 |
| DE | 19522397 A | 1/1997 |
| EP | 0150497 A2 | 8/1985 |
| EP | 0373465 A2 | 6/1990 |
| EP | 0557990 A1 | 9/1993 |
| EP | 673778 B1 | 9/1995 |
| EP | 1193050 A1 | 4/2002 |
| EP | 1452331 A2 | 9/2004 |
| GB | 1464449 A | 2/1977 |
| JP | 2003-208589 A | 7/2003 |
| WO | WO-98/07573 A1 | 2/1998 |
| WO | WO-2004/050766 A | 6/2004 |
| WO | WO-2004/050767 A | 6/2004 |
| WO | WO-2006/042714 A1 | 4/2006 |

OTHER PUBLICATIONS

English Translation of the International Preliminary Report on Patentability and Written Opinion for PCT/EP2013/050750 mailed on Jul. 31, 2014.

Ashton et al., "The Role of Phosphites in Stabilization of Non-Polyolefin Polymers", Plastics-The Magical Solution: Conference Proceedings, vol. 3, pp. 2818-2825, Antec 2000 (May 7-11, 2000 Orlando Florida Society of Plastic Engineers).

* cited by examiner

PLASTIC FILM FOR PRINTING BY DYE DIFFUSION THERMAL TRANSFER PRINTING

CROSS-REFERENCE TO RELATED APPLICATIONS

This application is a national stage application (under 35 U.S.C. §371) of PCT/EP2013/050750, filed Jan. 16, 2013, which claims benefit of European Application No. 12151745.2, filed Jan. 19, 2012, both of which are incorporated herein by reference in their entirety.

The invention relates to a special layer construction and a special film of plastic for the production of such a layer construction which is suitable for printing by means of dye diffusion thermal transfer printing, a process for the production thereof and a security and/or valuable document comprising such a layer construction.

In the production of security and/or valuable documents, in particular identification documents in the form of cards (ID cards), there is the need for coloured personalization of the documents, but without lowering the forgery security thereof. The application of coloured layers which, within the ID cards, due to the lack of compatibility with the layers of plastic surrounding them, would allow the possibility of subsequent breaking open and modification of the information is therefore to be avoided. In the past there have been many different set-ups for eliminating this problem and rendering possible a coloured personalization with a high forgery security.

One of these consists of the use of dye diffusion thermal transfer printing of coloured information on substrates of plastic as an alternative to other printing processes, since this offers the advantage of a high image accuracy in coloured printing, and images and information personalized on the spot can also be printed in good quality by this means. In this printing variant the printing ink furthermore should be absorbed into the plastics material to be printed, so that no intentional breaking sites for subsequent separation are formed by a separate colour layer in the documents.

If substrates of plastic are used for such printing, however, there is the problem that the surface of the substrate of plastic must offer an adequate absorbency for the printing ink, without the image sharpness and colour intensity thereby being impaired. In many cases, the colour intensity of the printed images in particular is in need of improvement.

Diverse plastics materials have already been discussed in the literature for printability by means of dye diffusion thermal transfer printing. Thus, according to Stark et al., Polymer 40 (1999) 4001-4011 diverse plastics are suitable as materials for dye acceptor coatings, but without concrete preferences being mentioned there. WO 98/07573 A1 discloses dye acceptor coatings of polyvinyl chloride copolymers. In Shearmur et al., Polymer 37, vol. 13 (1996) 2695-2700, diverse polyesters and polyvinyl butyral are investigated as possible materials for dye acceptor layers. None of these documents, however, is concerned with the colour intensity or image sharpness of the printed images achieved.

U.S. Pat. No. 5,334,573 investigates suitable materials with the aim of avoiding sticking of the dye acceptor sheets to the dye donor sheets.

EP 673 778 B1 discloses thermotransfer receiver films with a coated, metallized polymer surface as the receiver film. Plastics, such as PVC, vinyl acetate/vinyl chloride copolymers, polyvinylidene acetals, PMMA and silicone surfaces based on polymers are mentioned here in particular for the receiver layer. Merely on the basis of the metallized surface, however, such films are excluded in view of the formation of intentional breaking sites in security and/or valuable documents.

There accordingly continues to be a need to provide dye receiver films or layers in which the colour intensity of the printed image when printing by means of dye diffusion thermal transfer printing is improved. In particular, this effect should be achieved without at the same time impairing the image sharpness of the printed image.

The present invention was therefore based on the object of discovering films or layers which can be printed by means of dye diffusion thermal transfer printing, the colour intensity of the printed image being improved. A further object was that when these films or layers are employed in dye diffusion thermal transfer printing, the image sharpness is not impaired substantially or detectably with the naked eye.

This object has been achieved, surprisingly, in that a layer or film comprising at least one poly- or copolycondensate of terephthalic acid or naphthalenedicarboxylic acid, during the production of which at least one phosphite is added to the plastics composition comprising at least one poly- or copolycondensate of terephthalic acid or naphthalenedicarboxylic acid, is used as the dye acceptor layer or dye acceptor film. By the use of poly- or copolycondensates of terephthalic acid or naphthalenedicarboxylic acid and the addition of phosphite during the production of these layers or films, the colour intensity of the printed image, surprisingly, is improved significantly.

The present invention accordingly provides a layer construction comprising
  at least one layer (A) comprising at least one thermoplastic and
  at least one layer (B) comprising at least one poly- or copolycondensate of terephthalic acid or naphthalenedicarboxylic acid,
characterized in that layer (B) has been produced from a plastics composition comprising at least one poly- or copolycondensate of terephthalic acid or naphthalenedicarboxylic acid and at least one phosphite.

Phosphites in the context of the present invention are to be understood as meaning esters of phosphonic acid (often also called phosphorous acid esters) with the general structure $P(OR)_3$, wherein R represents aliphatic, aromatic and/or cycloaliphatic hydrocarbon radicals, preferably aliphatic and/or cycloaliphatic hydrocarbon radicals, wherein the hydrocarbon radicals R can optionally also comprise hetero atoms, such as e.g. oxygen or nitrogen, and wherein the aromatic hydrocarbon radicals can have further substituents, such as, for example, alkyl groups.

Preferred phosphites in the context of the invention are those which comprise at least one oxetane group. Such phosphites containing oxetane groups can comprise one, two or three oxetane groups. Mixtures of several phosphites containing oxetane groups can also be employed. Phosphites containing oxetane groups can be prepared in a manner known to the person skilled in the art, for example by transesterification of alcohols or phenols containing oxetane groups—optionally in a mixture with alcohols or phenols which are free from oxetane groups—with trialkyl or triaryl phosphites or by reaction of phosphorus trichloride with the corresponding alcohols or phenols containing oxetane groups—optionally in a mixture with alcohols or phenols which are free from oxetane groups—in the presence of acid-binding agents (cf. e.g. U.S. Pat. No. 3,209,013).

Examples of alcohols or phenols containing oxetane groups are 3-ethyl-3-hydroxymethyloxetane, 3-methyl-3-hydroxymethyloxetane, 3-pentyl-3-hydroxymethyloxetane, 3-hexadecyl-3-hydroxymethyloxetane, 3-phenyl-3-hydroxymethyloxetane, 3-p-tolyl-3-hydroxymethyloxetane, 3-benzyl-3-hydroxymethyloxetane, 3-chloromethyl-3-hydroxymethyloxetane, 3-bromomethyl-3-hydroxymethyloxetane, 3-fluoromethyl-3-hydroxymethyloxetane, 3-cyanomethyl-3-hydroxymethyloxetane, 3-methoxymethyl-3-hydroxymethyloxetane, 3-ethoxymethyl-3-hydroxymethyloxetane, 3-butoxymethyl-3-hydroxymethyloxetane, 3-octadecyloxymethyl-3-hydroxymethyloxetane, 3-phenyloxy-3-hydroxymethyloxetane, 3-p-tolyloxy-3-hydroxymethyloxetane, 3-benzyloxy-3-hydroxymethyloxetane, 3-acetyloxy-3-hydroxymethyloxetane, 3-oleyloxy-3-hydroxymethyloxetane, 3-stearyloxy-3-hydroxymethyloxetane, 3-ethyl-3-hydroxyoxetane, 3-methyl-3-hydroxyoxetane, 3,3-bis-hydroxymethyloxetane and p-(3-ethyloxetanyl-3-oxymethyl)-phenol.

Particularly preferred examples of alcohols or phenols containing oxetane groups are 3-ethyl-3-hydroxymethyloxetane, 3-pentyl-3-hydroxymethyloxetane, 3,3-bishydroxymethyloxetane and p-(3-ethyloxetanyl-3-oxymethyl)-phenol.

Examples of alcohols or phenols which are free from oxetane groups are decyl alcohol, stearyl alcohol, benzyl alcohol, glycol, trimethylolpropane, pentaerythritol, sorbitol, neopentyl glycol, dimethylolcyclohexane, diethylene glycol, thiodiglycol, phenol, p-chlorophenol, p-nonylphenol, pyrocatechol, di-t-butylpyrocatechol and 2,2-bis-(4-hydroxyphenyl)-propane.

Examples of phosphites containing oxetane groups are tris-[(3-ethyloxetan-3-yl)-methyl]phosphite, bis-[(3-ethyloxetan-3-yl)-methyl]phosphite, mono-[(3-ethyloxetan-3-yl)-methyl]phosphite, tris-[(3-pentyloxetan-3-yl)-methyl]phosphite, bis-[(3-pentyloxetan-3-yl)-methyl]phosphite, tris-[(3-hexadecyloxetan-3-yl)-methyl]phosphite, bis-[(3-hexadecyloxetan-3-yl)-methyl]phosphite, tris-[(3-phenyloxetan-3-yl)-methyl]phosphite, bis-[(3-phenyloxetan-3-yl)-methyl]phosphite, tris-[(3-p-tolyloxetan-3-yl)-methyl]phosphite, bis-[(3-p-tolyloxetan-3-yl)-methyl]phosphite, tris-[(3-benzyloxetan-3-yl)-methyl]phosphite, bis-[(3-benzyloxetan-3-yl)-methyl]phosphite, phenyl bis-[(3-ethyloxetan-3-yl)-methyl]phosphite, 2-phenoxy-spiro(1,3,2-dioxaphosphorinan-5,3'-oxetane), 3,3-bis-[spiro(oxetan-3',5"-(1",3",2"-dioxa-2"-phosphorinan))-oxy-methyl]-oxetane and P,P'-[(1-methylethylidene)di-4,1-phenylene]-P,P,P',P'-tetrakis [(3-ethyl-3-oxetanyl)-methyl]phosphite. Further suitable examples are disclosed in U.S. Pat. No. 3,209,013.

Particularly preferred phosphites containing oxetane groups are tris-[(3-ethyloxetan-3-yl)-methyl]phosphite, bis-[(3-ethyloxetan-3-yl)-methyl]phosphite, mono-[(3-ethyloxetan-3-yl)-methyl]phosphite, tris-[(3-pentyloxetan-3-yl)-methyl]phosphite, bis-[(3-pentyloxetan-3-yl)-methyl]phosphite, phenyl bis-[(3-ethyloxetan-3-yl)-methyl]phosphite, 2-phenoxy-spiro(1,3,2-dioxaphosphorinan-5,3'-oxetane), 3,3-bis-[spiro(oxetan-3',5"-(1",3",2"-dioxa-2"-phosphorinan))-oxy-methyl]-oxetane and P,P'-[(1-methylethylidene)di-4,1-phenylene]-P,P,P',P'-tetrakis [(3-ethyl-3-oxetanyl)-methyl]phosphite.

Very particularly preferred phosphites containing oxetane groups are tris-[(3-ethyloxetan-3-yl)-methyl]phosphite, bis-[(3-ethyloxetan-3-yl)-methyl]phosphite or mono-[(3-ethyloxetan-3-yl)-methyl]phosphite, and mixture comprising these or mixtures of these.

In particularly preferred embodiments of the invention, the plastics composition for the production of the layer (B) comprises at least tris-[(3-ethyloxetan-3-yl)-methyl]phosphite as the phosphite.

The abovementioned phosphites containing oxetane groups are known to the person skilled in the art and are described in the literature as stabilizers for halogenated polymers (cf. U.S. Pat. No. 3,209,013) or polycarbonates (cf. DE-A 2 140 207). Their surprising influence on the colour intensity of dye diffusion thermal transfer printing images on special polyester layers, however, has not hitherto been described in the literature.

The plastics composition for the layer (B) preferably comprises the phosphites in an amount of from 0.005 to 2 wt. %, particularly preferably from 0.01 to 1 wt. %, very particularly preferably from 0.05 to 0.5 wt. %—based on the total weight of the plastics composition for the layer (B).

The phosphites added to the plastics composition can at least partly hydrolyse or be oxidized, i.e. in the case of oxidation a transition from oxidation stage +III of the phosphorus into oxidation stage +V takes place, during the processing of the plastics composition to give the layer (B) or also subsequently in the finished layer (B).

Suitable poly- or copolycondensates of terephthalic acid or naphthalenedicarboxylic acid are, for example and preferably, poly- or copolyethylene terephthalate (PET or CoPET), glycol-modified PET (PETG) or poly- or copolybutylene terephthalate (PBT or CoPBT), poly- or copolyethylene naphthalate (PEN or CoPEN) or mixtures of the abovementioned.

In preferred embodiments of the invention, suitable poly- or copolycondensates of terephthalic acid or naphthalenedicarboxylic acid are polyalkylene terephthalates or polyalkylene naphthalates. Suitable polyalkylene terephthalates or polyalkylene naphthalates are, for example, reaction products of aromatic dicarboxylic acids or their reactive derivatives (e.g. dimethyl esters or anhydrides) and aliphatic, cycloaliphatic or araliphatic diols and mixtures of these reaction products.

Preferred poly- or copolycondensates of terephthalic acid or naphthalenedicarboxylic acid can be prepared from terephthalic acid or naphthalene-2,6-dicarboxylic acid (or their reactive derivatives) and aliphatic or cycloaliphatic diols having 2 to 10 C atoms by known methods (Kunststoff-Handbuch, vol. VIII, p. 695 et seq., Karl-Hanser-Verlag, Munich 1973).

Preferred poly- or copolycondensates of terephthalic acid or naphthalenedicarboxylic acid comprise at least 80 mol %, preferably 90 mol % of radicals which result from the use of terephthalic acid or naphthalenedicarboxylic acid, based on the dicarboxylic acid component, in the preparation and at least 80 mol %, preferably at least 90 mol % of radicals which result from the use of ethylene glycol, cyclohexane-1.4-dimethanol and/or butane-1,4-diol, based on the diol component, in the preparation.

The preferred poly- or copolycondensates of terephthalic acid or naphthalenedicarboxylic acid can comprise, in addition to terephthalic acid radicals or naphthalenedicarboxylic acid radicals, up to 20 mol % of radicals of other aromatic dicarboxylic acids having 8 to 14 C atoms or aliphatic dicarboxylic acids having 4 to 12 C atoms, such as, for example, radicals of phthalic acid, isophthalic acid, naphthalene-2,6-dicarboxylic acid (in the case of polyalkylene terephthalates), terephthalic acid (in the case of polyalkylene naphthalates), 4,4'-diphenyldicarboxylic acid, succinic, adipic, sebacic acid, azelaic acid and/or cyclohexanediacetic acid.

The preferred poly- or copolycondensates of terephthalic acid or naphthalenedicarboxylic acid can comprise, in addition to radicals of ethylene glycol, butane-1,4-diol and/or cyclohexane-1,4-dimethanol, up to 20 mol % of radicals of other aliphatic diols having 3 to 12 C atoms or cycloaliphatic diols having 6 to 21 C atoms, e.g. radicals of propane-1,3-diol, 2-ethylpropane-1,3-diol, neopentyl glycol, pentane-1,5-diol, hexane-1,6-diol, 3-methylpentane-2,4-diol, 2-methylpentane-2,4-diol, 2,2,4-trimethylpentane-1,3-diol and 2-ethylhexane-1,6-diol, 2,2-diethylpropane-1,3-diol, hexane-2,5-diol, 1,4-di-([beta]-hydroxyethoxy)-benzene, 2,2-bis-(4-hydroxycyclohexyl)-propane, 2,4-dihydroxy-1,1,3,3-tetramethylcyclobutane, 2,2-bis-(3-[beta]-hydroxyethoxyphenyl)-propane and 2,2-bis-(4-hydroxypropoxyphenyl)-propane (cf. DE-A 24 07 674, 24 07 776, 27 15 932).

Particularly preferred poly- or copolycondensates of terephthalic acid or naphthalenedicarboxylic acid comprise as radicals of one or more diol components those of cyclohexane-1,4-dimethanol. The particularly preferred polyalkylene terephthalates or polyalkylene naphthalates preferably comprise such radicals of cyclohexane-1,4-dimethanol to the extent of a content of at least 15 mol %, particularly preferably of at least 20 mol %, very particularly preferably of at least 30 mol %, based on the diol component. Preferably, the particularly preferred polyalkylene terephthalates or polyalkylene naphthalates comprise such radicals of cyclohexane-1,4-dimethanol to the extent of a content of at most 95 mol %, particularly preferably of at most 90 mol %, very particularly preferably of at most 80 mol %, based on the diol component. Furthermore preferably, the particularly preferred polyalkylene terephthalates or polyalkylene naphthalates comprise such radicals of cyclohexane-1,4-dimethanol to the extent of a content of from 15 to 95 mol %, particularly preferably from 20 to 90 mol %, very particularly preferably from 30 to 80 mol %, based on the diol component.

The poly- or copolycondensates of terephthalic acid or naphthalenedicarboxylic acid can be branched by incorporation of relatively small amounts of 3- or 4-functional alcohols or 3- or 4-basic carboxylic acids, such as are described e.g. in DE-A 19 00 270 and U.S. Pat. No. 3,692,744. Examples of preferred branching agents are trimesic acid, trimellitic acid, trimethylolethane and -propane and pentaerythritol. Preferably, not more than 1 mol % of the branching agent, based on the acid component, is used.

Polyalkylene terephthalates which have been prepared solely from terephthalic acid and reactive derivatives thereof (e.g. dialkyl esters thereof) and ethylene glycol, cyclohexane-1,4-dimethanol and/or butane-1,4-diol, and mixtures comprising such polyalkylene terephthalates or polyalkylene naphthalates which have been prepared solely from naphthalenedicarboxylic acid and reactive derivatives thereof (e.g. dialkyl esters thereof) and ethylene glycol, cyclohexane-1,4-dimethanol and/or butane-1,4-diol are very particularly preferred.

Of the poly- or copolycondensates of terephthalic acid or naphthalenedicarboxylic acid, the poly- or copolycondensates of terephthalic acid are particularly preferred.

Particularly preferred polyalkylene terephthalates are also copolyesters which are prepared from at least two of the abovementioned acid components and/or from at least two of the abovementioned alcohol components, and particularly preferred copolyesters are poly(ethylene glycol/cyclohexane-1,4-dimethanol) terephthalates.

The poly- or copolycondensates of terephthalic acid or naphthalenedicarboxylic acid preferably have an intrinsic viscosity of from approx. 0.4 to 1.5 dl/g, preferably from 0.5 to 1.3 dl/g, in each case measured in phenol/tetrachloroethane (1:1 parts by wt.) at 25° C.

The layer (B) and therefore also the plastics composition for the production thereof can comprise one or more of the poly- or copolycondensate(s) of terephthalic acid or naphthalenedicarboxylic acid It is also possible for layer (B) and therefore also the plastics composition for the production thereof to comprise one or more further thermoplastic(s). Possible such thermoplastics are those mentioned in the following for the layer (A). The plastics composition of the layer (B) preferably comprises one or more poly- or copolycondensate(s) of terephthalic acid or naphthalenedicarboxylic acid to the extent of at least 50 wt. %, particularly preferably to the extent of at least 60 wt. %, very particularly preferably to the extent of at least 70 wt. %.

In preferred embodiments of the invention, the layer (B) and therefore also the plastics composition for the production thereof comprises at least one polycarbonate or copolycarbonate based on diphenols as a further thermoplastic. Possible such polycarbonates or copolycarbonates based on diphenols are, for example and preferably, those mentioned in the following for the layer (A). Preferably, the plastics composition for the layer (B) comprises 30 wt. % or less, particularly preferably from 0.1 to 25 wt. %, very particularly preferably from 0.5 to 20 wt. % of polycarbonate(s) or copolycarbonate(s) based on diphenols.

The softening temperature of the layer (B) can be increased by the addition of polycarbonate(s) or copolycarbonate(s) based on diphenols. Such an addition of polycarbonate(s) or copolycarbonate(s) based on diphenols can furthermore have the effect of a better adhesion of the layer (B) to adjacent layers comprising polycarbonate(s) or copolycarbonate(s) based on diphenols in security and/or valuable documents, which additionally makes subsequent separation of the documents difficult and increases the forgery security thereof.

The layer (B) and therefore also the plastics composition for the production thereof can comprise at least one laser-sensitive additive.

Possible laser-sensitive additives are, for example, so-called laser marking additives, i.e. those of an absorber in the wavelength range of the laser to be used, preferably in the wavelength range of ND:YAG lasers (neodymium-doped yttrium-aluminium-garnet lasers). Such laser marking additives and the use thereof in moulding compositions are described, for example, in WO-A 2004/50766 and WO-A 2004/50767 and are available commercially from DSM under the brand name Micabs®. Absorbers which are furthermore suitable as laser-sensitive additives are carbon black, coated laminar silicates, as described e.g. in DE-A-195 22 397 and commercially obtainable under the brand name Lazerflair®, antimony-doped tin oxide, as described e.g. in U.S. Pat. No. 6,693,657 and commercially obtainable under the brand name Mark-It™, and phosphorus-containing tin/copper mixed oxides, as described e.g. in WO-A 2006/042714. It is preferable for the particle size of the laser-sensitive additive to be in the range of from 100 nm to 10 µm, and particularly advantageous for it to be in the range of from 500 nm to 2 µm. A very particularly preferred laser-sensitive additive is carbon black.

In further preferred embodiments, the layer (B) and therefore also the plastics composition for the production thereof preferably comprises at least one blue or violet dyestuff. It particularly preferably comprises such a dyestuff in an amount of from 0.1 to 100 ppm, particularly preferably from 0.5 to 50 ppm, very particularly preferably 1.0 to 30 ppm, based on the total weight of the plastics composition for the layer (B).

Possible suitable blue or violet dyestuffs are all the blue or violet dyestuffs known to the person skilled in the art which can be incorporated into plastics compositions and survive the processing temperatures, for example during extrusion. Blue or violet anthraquinone dyestuffs, for example those of the Makrolex® series, are preferably possible. There may be mentioned by way of example as possible for this Makrolex® Violet 3R (Solvent Violet 36) or 1,4-bis-[(2,6-diethyl-4-methylphenyl)-amino]-9,10-anthracenedione (Macrolex® Blue RR).

Possible thermoplastics for the layer (A) independently of each other are thermoplastics chosen from polymers of ethylenically unsaturated monomers and/or polycondensates of bifunctional reactive compounds. For certain uses, it may be advantageous to employ a transparent thermoplastic. In particularly preferred embodiments, the layers of plastic mentioned can unanimously have at least one thermoplastic chosen from the abovementioned groups.

Particularly suitable thermoplastics are polycarbonates or copolycarbonates based on diphenols, poly- or copolyacrylates and poly- or copolymethacrylates, such as, by way of example and preferably, polymethyl methacrylate, poly- or copolymers with styrene, such as, by way of example and preferably, transparent polystyrene or polystyrene/acrylonitrile (SAN), transparent thermoplastic polyurethanes, and polyolefins, such as, by way of example and preferably, transparent polypropylene types or polyolefins based on cyclic olefins (e.g. TOPAS®, Hoechst) or polyolefin-based materials, such as e.g. Teslin®, poly- or copolycondensates of terephthalic acid or naphthalenedicarboxylic acid, such as, by way of example and preferably, poly- or copolyethylene terephthalate (PET or CoPET), glycol-modified PET (PETG) or poly- or copolybutylene terephthalate (PBT or CoPBT), poly- or copolyethylene naphthalate (PEN or CoPEN) or mixtures of the abovementioned.

Polycarbonates or copolycarbonates, in particular having average molecular weights $M_w$ of from 500 to 100,000, preferably from 10,000 to 80,000, particularly preferably from 15,000 to 40,000, or blends comprising at least one such polycarbonate or copolycarbonate are very particularly preferred. Blends of the abovementioned polycarbonates or copolycarbonates with at least one poly- or copolycondensate of terephthalic acid, in particular at least one such poly- or copolycondensate of terephthalic acid having average molecular weights $M_w$ of from 10,000 to 200,000, preferably from 26,000 to 120,000, are furthermore also preferred. In particularly preferred embodiments of the invention, the blend is a blend of polycarbonate or copolycarbonate with poly- or copolybutylene terephthalate. Such a blend of poly- carbonate or copolycarbonate with poly- or copolybutylene terephthalate can preferably be one with 1 to 90 wt. % of polycarbonate or copolycarbonate and 99 to 10 wt. % of poly- or copolybutylene terephthalate, preferably with 1 to 90 wt. % of polycarbonate and 99 to 10 wt. % of polybutylene terephthalate, the contents adding up to 100 wt. %. Such a blend of polycarbonate or copolycarbonate with poly- or copolybutylene terephthalate can particularly preferably be one with 20 to 85 wt. % of polycarbonate or copolycarbonate and 80 to 15 wt. % of poly- or copolybutylene terephthalate, preferably with 20 to 85 wt. % of polycarbonate and 80 to 15 wt. % of polybutylene terephthalate, the contents adding up to 100 wt. %. Such a blend of polycarbonate or copolycarbonate with poly- or copolybutylene terephthalate can very particularly preferably be one with 35 to 80 wt. % of polycarbonate or copolycarbonate and 65 to 20 wt. % of poly- or copolybutylene terephthalate, preferably with 35 to 80 wt. % of polycarbonate and 65 to 20 wt. % of polybutylene terephthalate, the contents adding up to 100 wt. %.

In preferred embodiments, particularly suitable polycarbonates or copolycarbonates are aromatic polycarbonates or copolycarbonates.

The polycarbonates or copolycarbonates can be linear or branched in a known manner.

The preparation of these polycarbonates can be carried out in a known manner from diphenols, carbonic acid derivatives, optionally chain terminators and optionally branching agents by means of solution or interfacial condensation or melt condensation. Details of the preparation of polycarbonates have been laid down in many patent specifications for about 40 years. Reference may be made here by way of example merely to Schnell, "Chemistry and Physics of Polycarbonates", Polymer Reviews, volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, volume 11, second edition, 1988, pages 648-718 and finally to Dres. U. Grigo, K. Kirchner and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Suitable diphenols can be, for example, dihydroxyaryl compounds of the general formula (I)

wherein Z is an aromatic radical having 6 to 34 C atoms, which can comprise one or more optionally substituted aromatic nuclei and aliphatic or cycloaliphatic radicals or alkylaryls or hetero atoms as bridge members.

Particularly preferred dihydroxyaryl compounds are resorcinol, 4,4'-dihydroxydiphenyl, bis-(4-hydroxyphenyl)-diphenylmethane, 1,1-bis-(4-hydroxyphenyl)-1-phenylethane, bis-(4-hydroxyphenyl)-1-(1-naphthyl)-ethane, bis-(4-hydroxyphenyl)-1-(2-naphthyl)-ethane, 2,2-bis-(4-hydroxyphenyl)-propane, 2,2-bis-(3,5-dimethyl-4-hydroxyphenyl)-propane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-3,3,5-trimethylcyclohexane, 1,1'-bis-(4-hydroxyphenyl)-3-diisopropylbenzene and 1,1'-bis-(4-hydroxyphenyl)-4-diisopropylbenzene.

Very particularly preferred dihydroxyaryl compounds are 4,4'-dihydroxydiphenyl, 2,2-bis-(4-hydroxyphenyl)-propane and bis-(4-hydroxyphenyl)-3,3,5-trimethylcyclohexane.

A very particularly preferred copolycarbonate can be prepared using 1,1-bis-(4-hydroxyphenyl)-3,3,5-trimethylcyclohexane and 2,2-bis-(4-hydroxyphenyl)-propane.

Suitable carbonic acid derivatives can be, for example, for the preparation by means of solution condensation, in particular interfacial condensation, phosgene, or for the preparation by means of melt condensation, diaryl carbonates of the general formula (II)

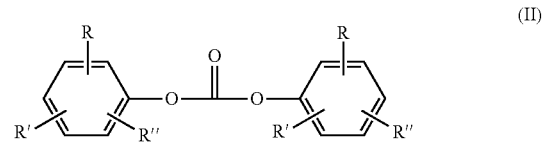

wherein
R, R' and R" independently of each another are identical or different and represent hydrogen, linear or branched $C_1$-$C_{34}$-alkyl, $C_7$-$C_{34}$-alkylaryl or $C_6$-$C_{34}$-aryl, and R can furthermore also denote —COO—R''', wherein R''' represents hydrogen, linear or branched $C_1$-$C_{34}$-alkyl, $C_7$-$C_{34}$-alkylaryl or $C_6$-$C_{34}$-aryl.

Particularly preferred diaryl compounds are diphenyl carbonate, 4-tert-butylphenyl phenyl carbonate, di-(4-tert-butylphenyl) carbonate, biphenyl-4-yl phenyl carbonate, di-(biphenyl-4-yl) carbonate, 4-(1-methyl-1-phenylethyl)-phenyl phenyl carbonate, di-[4-(1-methyl-1-phenylethyl)-phenyl] carbonate and di-(methyl salicylate) carbonate.

Diphenyl carbonate is very particularly preferred.

Either one diaryl carbonate or different diaryl carbonates can be used

One or more monohydroxyaryl compound(s) which has/have not been used for the preparation of the diaryl carbonate (s) used can additionally be employed, for example, as chain terminators to control or modify the end groups. These can be those of the general formula (III)

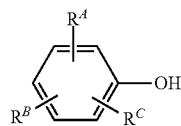

(III)

wherein $R^A$ represents linear or branched $C_1$-$C_{34}$-alkyl, $C_7$-$C_{34}$-alkylaryl, $C_6$-$C_{34}$-aryl or —COO—$R^D$, wherein $R^D$ represents hydrogen, linear or branched $C_1$-$C_{34}$-alkyl, $C_7$-$C_{34}$-alkylaryl or $C_6$-$C_{34}$-aryl, and $R^B$, $R^D$ independently of each other are identical or different and represent hydrogen, linear or branched $C_1$-$C_{34}$-alkyl, $C_7$-$C_{34}$-alkylaryl or $C_6$-$C_{34}$-aryl.

4-tert-Butylphenol, 4-iso-octylphenol and 3-pentadecylphenol are preferred.

Suitable branching agents can be compounds having three and more functional groups, preferably those having three or more hydroxyl groups.

Preferred branching agents are 3,3-bis-(3-methyl-4-hydroxyphenyl)-2-oxo-2,3-dihydroindole and 1,1,1-tri-(4-hydroxyphenyl)-ethane.

In preferred embodiments of the invention, suitable poly- or copolycondensates of terephthalic acid or naphthalenedicarboxylic acid are those already mentioned for the layer (B). In the context of the invention, translucent is to be understood as meaning that this has a transmission in the visible wavelength range of from 380 nm to 780 nm of less than 50%, preferably of less than 35%, particularly preferably of less than 25%, in very particularly preferred embodiments of less than 15%.

A white or translucent layer (A) is preferably a layer coloured white with pigments or having a filler content of fillers. Such layers, preferably layers of plastic, coloured white or having a filler content of fillers preferably comprise titanium dioxide, zirconium dioxide, barium sulfate or glass fibres as pigments and/or fillers. The pigments or fillers mentioned are preferably added to the plastics before the shaping to give the layer (A), which can be carried out, for example, by extrusion or coextrusion, in amounts of from 2 to 60 wt. %, particularly preferably from 10 to 40 wt. %, based on the total weight of pigment or filler and plastics material. A white or translucent layer (A) can also be a layer of Teslin®.

In preferred embodiments of the invention, the layer construction according to the invention comprises at least two layers (B), the layer (A) being between two layers (B).

The layer construction according to the invention can have one or more further layer(s) comprising at least one thermoplastic between the layer (A) and the layer(s) (B). These can be translucent or white layers, transparent layers or coloured layers.

Translucent layers in the context of this invention are understood as meaning those layers having a transmission in the visible wavelength range of from 380 nm to 780 nm of less than 50%, preferably of less than 35%, particularly preferably of less than 25%, in very particularly preferred embodiments of less than 15%.

Transparent layers in the context of this invention are understood as meaning those layers having a transmission in the visible wavelength range of from 380 nm to 780 nm of greater than 50%, preferably of greater than 65%, particularly preferably of greater than 75%, in very particularly preferred embodiments of greater than 85%.

Layer (A) and/or one of the further layers comprising at least one thermoplastic can comprise at least one laser-sensitive additive. Suitable laser-sensitive additives are, for example, those already mentioned for the layer (B).

In preferred embodiments, the layer (A) comprises as a thermoplastic at least one polycarbonate or copolycarbonate and the layer(s) (B) have been produced from a plastics composition comprising at least one poly- or copolycondensate of terephthalic acid or naphthalenedicarboxylic acid, preferably at least one poly- or copolycondensate of terephthalic acid, very particularly preferably at least one glycol-modified poly- or copolycondensate of terephthalic acid (PETG), and at least one phosphite. Particularly preferably, in these preferred embodiments of the invention the layer (B) comprises at least one laser-sensitive additive in the or at least one layer (B). Particularly preferably, the layer (A) and the layer(s) (B) in these preferred embodiments of the invention are transparent layers.

In further preferred embodiments, the layer (A) comprises as a thermoplastic at least one polycarbonate or copolycarbonate, wherein the layer (A) is coloured white with pigments or has a filler content of fillers, i.e. is white or translucent, and the layer(s) B have been produced from a plastics composition comprising at least one poly- or copolycondensate of terephthalic acid or naphthalenedicarboxylic acid, preferably at least one poly- or copolycondensate of terephthalic acid, very particularly preferably at least one glycol-modified poly- or copolycondensate of terephthalic acid (PETG), and at least one phosphite. Particularly preferably, in these preferred embodiments of the invention the layer (B) comprises at least one laser-sensitive additive in the or at least one layer (B). Particularly preferably, the layer(s) (B) in these preferred embodiments of the invention are transparent layers.

In preferred embodiments, the layer (A) comprises as a thermoplastic at least one poly- or copolycondensate of terephthalic acid or naphthalenedicarboxylic acid, preferably at least one poly- or copolycondensate of terephthalic acid, very particularly preferably at least one glycol-modified poly- or copolycondensate of terephthalic acid (PETG), and the layer(s) (B) have been produced from a plastics composition comprising at least one poly- or copolycondensate of terephthalic acid or naphthalenedicarboxylic acid, preferably at least one poly- or copolycondensate of terephthalic acid, very particularly preferably at least one glycol-modified poly- or copolycondensate of terephthalic acid (PETG), and at least one phosphite. Particularly preferably, in these preferred embodiments of the invention the or at least one layer (B) comprises at least one laser-sensitive additive. Particularly preferably, the layer (A) and the layer(s) (B) in these preferred embodiments of the invention are transparent layers.

In further preferred embodiments, the layer (A) comprises as a thermoplastic at least one poly- or copolycondensate of terephthalic acid or naphthalenedicarboxylic acid, preferably at least one poly- or copolycondensate of terephthalic acid, very particularly preferably at least one glycol-modified poly- or copolycondensate of terephthalic acid (PETG), wherein the layer (A) is coloured white with pigments or has a filler content of fillers, i.e. is white or translucent, and the layer(s) (B) have been produced from a plastics composition comprising at least one poly- or copolycondensate of terephthalic acid or naphthalenedicarboxylic acid, preferably at least one poly- or copolycondensate of terephthalic acid, very particularly preferably at least one glycol-modified poly- or copolycondensate of terephthalic acid (PETG), and at least one phosphite. Particularly preferably, in these preferred embodiments of the invention the or at least one layer (B) comprises at least one laser-sensitive additive. Particularly preferably, the layer(s) (B) in these preferred embodiments of the invention are transparent layers.

The layers (A) in the abovementioned preferred embodiments can also comprise as a thermoplastic a blend of at least one poly- or copolycondensate of terephthalic acid or naphthalenedicarboxylic acid and at least one polycarbonate or copolycarbonate. Preferably, this is a blend of polycarbonate or copolycarbonate with poly- or copolybutylene terephthalate.

The layer(s) (B) in the abovementioned preferred embodiments can preferably furthermore comprise at least one polycarbonate or copolycarbonate.

The layers present according to the invention, layer (A), layer (B) and further layers comprising at least one thermoplastic, preferably have in each case a thickness of from 20 µm to 850 µm, particularly preferably in each case a thickness of from 25 µm to 700 µm, very particularly preferably in each case a thickness of from 30 µm to 500 µm. In this context, several layers can have the same or all layers can have different layer thicknesses. Preferably, the layer(s) (B) has or have a layer thickness of from 10 µm to 300 µm, particularly preferably in each case a thickness of from 12.5 µm to 200 µm, very particularly preferably from 15 µm to 150 µm. Preferably, the layer (A) has a layer thickness of from 20 µm to 750 µm, particularly preferably in each case a thickness of from 50 µm to 700 µm, very particularly preferably from 75 µm to 650 µm.

The layer construction according to the invention can be produced by a procedure in which various films of plastic are bonded to one another by means of lamination, or the layer construction is produced by means of coextrusion.

The layer construction according to the invention—preferably in the case of production by coextrusion—can also be a film of plastic.

The present invention therefore also provides a process for the production of a layer construction, in which various films of plastic are bonded to one another by means of lamination or the layer construction is produced by means of coextrusion.

In the case of lamination, the individual films, e.g. at least one film of plastic for the layer (B) and one film of plastic for the layer (A) and optionally further films of plastic for further layers, are laid on top of one another in the desired sequence and bonded to one another by means of lamination. The processes of lamination and of coextrusion can also be combined in the process according to the invention in that individual films for the lamination already have several layers produced by coextrusion.

In particular, films of plastic for the production of the layer (B) which can be employed for the production of the layer construction according to the invention, for example in the process according to the invention, have not hitherto been described in the literature.

Such films of plastic for the layer (B) are produced from a plastics composition comprising at least one poly- or copolycondensate of terephthalic acid or naphthalenedicarboxylic acid and at least one phosphite.

The present invention therefore preferably provides a process for the production of a layer construction according to the invention, in which
   at least one film of plastic or at least one layer of a film of plastic is produced from a plastics composition comprising at least one poly- or copolycondensate of terephthalic acid or naphthalenedicarboxylic acid and at least one phosphite
   at least one of these films of plastic is laid together with a film of plastic for the layer (A) and optionally one or more further films of plastic in the desired sequence to give a film stack
   and these films are bonded to one another by means of lamination with one another to give a layer construction.

In the sequence of laying the films of plastic on one another, the film of plastic or the layer of the film of plastic produced from a plastics composition comprising at least one poly- or copolycondensate of terephthalic acid or naphthalenedicarboxylic acid and at least one phosphite is one of the two outer layers. In the case where more than one of these films of plastic are employed, preferably both the outer layers are formed from one of these films of plastic or a layer of this film of plastic produced from a plastics composition comprising at least one poly- or copolycondensate of terephthalic acid or naphthalenedicarboxylic acid and at least one phosphite.

A process for the production of a layer construction according to the invention in which at least one layer (B) and at least one layer (A) are produced by means of coextrusion, a plastics composition comprising at least one poly- or copolycondensate of terephthalic acid or naphthalenedicarboxylic acid and at least one phosphite being used for the coextrusion of the layer (B), is furthermore preferred.

The present invention therefore likewise provides a single- or multilayer film of plastic comprising at least one layer comprising at least one poly- or copolycondensate of terephthalic acid or naphthalenedicarboxylic acid, characterized in that this layer has been produced from a plastics composition comprising at least one poly- or copolycondensate of terephthalic acid or naphthalenedicarboxylic acid and at least one phosphite.

In preferred embodiments, the film of plastic according to the invention is a single-layer film—also called a monofilm—which consists of the layer produced from a plastics composition comprising at least one poly- or copolycondensate of terephthalic acid or naphthalenedicarboxylic acid and at least one phosphite. Possible poly- or copolycondensate(s) of terephthalic acid or naphthalenedicarboxylic acid and phosphite(s) are those above for the layer construction according to the invention.

In this context, the monofilm according to the invention preferably has a thickness of from 20 to 300 µm, particularly preferably from 30 to 200 µm, very particularly preferably from 40 to 150 µm.

In preferred embodiments of the invention, the monofilm according to the invention can have at least one laser-sensitive additive, the laser-sensitive additives already mentioned above for the layer construction according to the invention being possible for this.

Such a monofilm can be produced, for example, by extruding a plastics composition comprising at least one poly- or copolycondensate of terephthalic acid or naphthalenedicarboxylic acid and at least one phosphite to form a film.

In further preferred embodiments of the invention, the film of plastic according to the invention is an at least two-layer film which, in addition to the layer (B) produced from at least one poly- or copolycondensate of terephthalic acid or naphthalenedicarboxylic acid and at least one phosphite, has at least one further layer (A) comprising at least one thermoplastic. In this context, the thermoplastics can be those already mentioned above for the layer construction according to the invention. Particularly preferred embodiments of the film of plastic according to the invention having at least two layers are those films of plastic which have at least one layer (A) comprising at least one thermoplastic and at least two layers (B) produced from at least one poly- or copolycondensate of terephthalic acid or naphthalenedicarboxylic acid and at least one phosphite, at least one layer (A) being between two layers (B).

In this context, the at least two-layer film according to the invention preferably has a total thickness of from 20 μm to 850 μm, particularly preferably in each case a thickness of from 25 μm to 700 μm, very particularly preferably in each case a thickness of from 30 μm to 500 μm. Preferably, the layer(s) (B) produced from at least one poly- or copolycondensate of terephthalic acid or naphthalenedicarboxylic acid and at least one phosphite has or have a layer thickness of from 10 μm to 300 μm, particularly preferably in each case a thickness of from 12.5 μm to 200 μm, very particularly preferably from 15 μm to 150 μm. Preferably, the layer (A) comprising at least one thermoplastic has a layer thickness of from 20 μm to 750 μm, particularly preferably in each case a thickness of from 50 μm to 700 μm, very particularly preferably from 75 μm to 650 μm.

In preferred embodiments of the invention, the at least two-layer film according to the invention can have at least one laser-sensitive additive in at least one layer, the laser-sensitive additives already mentioned above for the layer construction according to the invention being possible for this. The at least two-layer film according to the invention can have at least one laser-sensitive additive in at least one layer (A) comprising at least one thermoplastic. Alternatively, the at least two-layer film according to the invention can have at least one laser-sensitive additive in the or at least one of the layers (B) produced from at least one poly- or copolycondensate of terephthalic acid or naphthalenedicarboxylic acid and at least one phosphite. The at least two-layer film according to the invention can also have at least one laser-sensitive additive both in at least one layer (A) comprising at least one thermoplastic and in the or at least one of the layers (B) produced from at least one poly- or copolycondensate of terephthalic acid or naphthalenedicarboxylic acid and at least one phosphite.

In preferred embodiments of the invention, the at least two-layer film according to the invention can comprise as a thermoplastic in the or at least one of the further layer(s) (A) comprising at least one thermoplastic at least one polycarbonate or copolycarbonate or at least one poly- or copolycondensate of terephthalic acid or naphthalenedicarboxylic acid.

Preferably, the or at least one of the further layer(s) (A) comprising at least one thermoplastic can be coloured white with pigments or have a filler content of fillers, i.e. can be white or translucent.

The at least two-layer films of plastic can be produced, for example, by coextrusion or by lamination.

In very particularly preferred embodiments of the film of plastic according to the invention—both the monofilms and the at least two-layer films—at least one poly- or copolycondensate of terephthalic acid or naphthalenedicarboxylic acid for the layer(s) produced from the phosphite-containing plastics composition is one comprising radicals of cyclohexane-1,4-dimethanol to the extent of a content of from 15 to 95 mol %, particularly preferably from 20 to 90 mol %, very particularly preferably from 30 to 80 mol %, based on the diol component.

In further very particularly preferred embodiments of the film of plastic according to the invention—both of the monofilms and of the at least two-layer films—the layer or the layer(s) produced from at least one poly- or copolycondensate of terephthalic acid or naphthalenedicarboxylic acid and at least one phosphite additionally comprise(s) at least one polycarbonate or copolycarbonate based on diphenols, the layer(s) comprising the polycarbonate(s) or copolycarbonate(s) in an amount of 30 wt. % or less, particularly preferably from 0.1 to 25 wt. %, very particularly preferably from 0.5 to 20 wt. %, based on the total weight of the plastics composition of the particular layer. In this context, possible polycarbonate(s) or copolycarbonate(s) are those already mentioned above for the layer constructions according to the invention.

Examples of embodiments of the film of plastic according to the invention are mentioned in the following, where these are not to be understood as meaning a limitation of the invention.

Examples of Monofilms:

Film produced from a plastics composition comprising at least one poly- or copolycondensate of terephthalic acid or naphthalenedicarboxylic acid, preferably at least one poly- or copolycondensate of terephthalic acid, and at least one phosphite.

Film produced from a plastics composition comprising at least one poly- or copolycondensate of terephthalic acid or naphthalenedicarboxylic acid, preferably at least one poly- or copolycondensate of terephthalic acid, at least one polycarbonate or copolycarbonate based on diphenols and at least one phosphite.

Film produced from a plastics composition comprising at least one poly- or copolycondensate of terephthalic acid or naphthalenedicarboxylic acid, preferably at least one poly- or copolycondensate of terephthalic acid, at least one polycarbonate or copolycarbonate based on diphenols, at least one phosphite and at least one laser-sensitive additive.

Examples of 2-Layer Films:

Film comprising a layer (B) produced from a plastics composition comprising at least one poly- or copolycondensate of terephthalic acid or naphthalenedicarboxylic acid, preferably at least one poly- or copolycondensate of terephthalic acid, and at least one phosphite and a further layer (A) comprising at least one poly- or copolycondensate of terephthalic acid or naphthalenedicarboxylic acid, preferably at least one poly- or copolycondensate of terephthalic acid, and/or at least one polycarbonate or copolycarbonate based on diphenols.

Film comprising a layer (B) produced from a plastics composition comprising at least one poly- or copolycondensate of terephthalic acid or naphthalenedicarboxylic acid, preferably at least one poly- or copolycondensate of terephthalic acid, and at least one phosphite and a further layer (A) comprising at least one poly- or copolycondensate of terephthalic acid or naphthalenedicarboxylic acid, preferably at least one poly- or copolycondensate of terephthalic acid, and/or at least one polycarbonate or copolycarbonate based on diphenols, the further layer being white or translucent.

Film comprising a layer (B) produced from a plastics composition comprising at least one poly- or copolycondensate of terephthalic acid or naphthalenedicarboxylic acid, preferably at least one poly- or copolycondensate of terephthalic acid, and at least one phosphite and a further layer (A) comprising at least one poly- or copolycondensate of terephthalic acid or naphthalenedicarboxylic acid, preferably at least one poly- or copolycondensate of terephthalic acid, and/or at least one polycarbonate or copolycarbonate based on diphenols.

In both examples of embodiments, the layer (B) produced from a plastics composition comprising at least one poly- or copolycondensate of terephthalic acid or naphthalenedicarboxylic acid and at least one phosphite can additionally also comprise at least one polycarbonate or copolycarbonate based on diphenols and/or at least one laser-sensitive additive.

Examples of 3-Layer Films:

Film comprising two layers (B) produced from a plastics composition comprising at least one poly- or copolycondensate of terephthalic acid or naphthalenedicarboxylic acid, preferably at least one poly- or copolycondensate of terephthalic acid, and at least one phosphite and a further layer (A), arranged between these two layers (B), comprising at least one poly- or copolycondensate of terephthalic acid or naphthalenedicarboxylic acid, preferably at least one poly- or copolycondensate of terephthalic acid, and/or at least one polycarbonate or copolycarbonate based on diphenols.

Film comprising two layers (B) produced from a plastics composition comprising at least one poly- or copolycondensate of terephthalic acid or naphthalenedicarboxylic acid, preferably at least one poly- or copolycondensate of terephthalic acid, and at least one phosphite and a further layer (A), arranged between these two layers (B), comprising at least one poly- or copolycondensate of terephthalic acid or naphthalenedicarboxylic acid, preferably at least one poly- or copolycondensate of terephthalic acid, and/or at least one polycarbonate or copolycarbonate based on diphenols, the further layer being white or translucent.

In both examples of embodiments, the two layers (B) produced from a plastics composition comprising at least one poly- or copolycondensate of terephthalic acid or naphthalenedicarboxylic acid and at least one phosphite can additionally also comprise at least one polycarbonate or copolycarbonate based on diphenols and/or at least one laser-sensitive additive.

In addition to the production of the layer construction according to the invention, the film of plastic according to the invention inter alia is also already suitable itself as a dye acceptor film in dye diffusion thermal transfer printing.

The layer construction according to the invention or the film of plastic according to the invention is preferably suitable for the production of security and/or valuable documents.

The present invention therefore also provides a security and/or valuable document comprising at least one layer construction according to the invention, preferably comprising one layer construction according to the invention.

Preferably, the security and/or valuable document according to the invention is an identification document, preferably an identity card (ID card), such as e.g. a personal identity card, passport, driving license, a bank card, credit card, insurance card, other identity card etc.

The layer(s) produced from at least one poly- or copolycondensate of terephthalic acid or naphthalenedicarboxylic acid and at least one phosphite in the layer construction according to the invention, in the film of plastic according to the invention or in the security and/or valuable document according to the invention can be printed on by means of dye diffusion thermal transfer printing. In this context, a particularly good colour intensity of the printed image is found, in contrast to other plastics compositions of the dye acceptor layers.

The present invention therefore also provides the use of a layer construction according to the invention, a film of plastic according to the invention or a security and/or valuable document according to the invention for printing the or at least one of the layer(s) produced from at least one poly- or copolycondensate of terephthalic acid or naphthalenedicarboxylic acid and at least one phosphite by means of dye diffusion thermal transfer printing.

In this context, the layer(s) produced from at least one poly- or copolycondensate of terephthalic acid or naphthalenedicarboxylic acid and at least one phosphite in the layer construction according to the invention, in the film of plastic according to the invention or in the security and/or valuable document according to the invention have outstanding dye receiver properties. In the case of printing by means of dye diffusion thermal transfer printing, it has been found, surprisingly, that the printing ink penetrates into the layer(s) produced from at least one poly- or copolycondensate of terephthalic acid or naphthalenedicarboxylic acid and at least one phosphite into a depth of more than 30 µm, preferably even of more than 50 µm, provided that the layer thickness of the layer in question exceeds the 30 µm, preferably the 50 µm. For printing by means of dye diffusion thermal transfer printing, in preferred embodiments it may therefore be advantageous to choose a layer thickness of the layer(s) (B) in the layer constructions or security and/or valuable documents according to the invention or a layer thickness of the layer(s) produced from at least one poly- or copolycondensate of terephthalic acid or naphthalenedicarboxylic acid and at least one phosphite in the films of plastic according to the invention of at least 30 µm, preferably of at least 50 µm. As a result, the colour intensity of the printed image can be improved still further compared with thinner layers.

The following examples serve to explain the invention by way of example and are not to be interpreted as a limitation.

EXAMPLES

Preparation or Provision of the Masterbatches (Compositions) for the Production of the Layer Constructions According to the Invention Example 1

Compounding of a Masterbatch Comprising a Thermoplastic and a Laser-Sensitive Additive The masterbatch for the production of the layer comprising a laser-sensitive additive was prepared with a conventional twin-screw compounding extruder (ZSK 32) at conventional processing temperatures for polycarbonate of from 250 to 330° C.

A masterbatch having the following composition was compounded and then granulated:

Polycarbonate Makrolon® 3108 from Bayer MaterialScience AG in a content of 99.994 wt. %

Flammruβ 101 (carbon black from Degussa) having an average particle size of 95 nm in a content of 0.006 wt. % (60 ppm).

Example 2

Compounding of a Masterbatch Comprising a Thermoplastic and a White Pigment as a Filler The masterbatch for the production of the layer comprising a thermoplastic and a white pigment as a filler was prepared with a conventional twin-screw compounding extruder (ZSK 32) at conventional processing temperatures for polycarbonate of from 250 to 330° C.
A masterbatch having the following composition was compounded and then granulated:
Polycarbonate Makrolon® 3108 from Bayer MaterialScience AG in a content of 85 wt. %
Titanium dioxide (Kronos® 2230 from Kronos Titan) as a white pigment filler in a content of 15 wt. %.

Example 3

Compounding of a Masterbatch Comprising a Thermoplastic and a Phosphite

The masterbatch for the production of the layer comprising a thermoplastic and a white pigment as a filler was prepared with a conventional twin-screw compounding extruder (ZSK 32) at conventional processing temperatures for polycarbonate of from 250 to 330° C.
A masterbatch having the following composition was compounded and then granulated:
Polycarbonate Makrolon® 3108 from Bayer MaterialScience AG in a content of 95 wt. %
Tris-(3-ethyloxetan-3-yl)-methyl)phosphite (CAS 39865-35-5) as an additive in a content of 5 wt. %

Example 4

Compounding of a Masterbatch Comprising a Thermoplastic and a Dye Concentrate The masterbatch for the production of the layer comprising a thermoplastic and a white pigment as a filler was prepared with a conventional twin-screw compounding extruder (ZSK 32) at conventional processing temperatures for polycarbonate of from 250 to 330° C.
A masterbatch having the following composition was compounded and then granulated:
Polycarbonate Makrolon® 3100 from Bayer MaterialScience AG in a content of 99.982 wt. %
Macrolex® Violet 3R (Solvent Violet 36; CAS: 61951-89-1) as a dyestuff in a content of 0.0071 wt. %
Macrolex® Blue RR (1,4-bis-[(2,6-diethyl-4-methylphenyl)-amino]-9,10-anthracenedione, CAS: 61969-44-6) as a dyestuff in a content of 0.0109 wt. %.

Example 5

Poly- or Copolycondensate of Terephthalic Acid

A polyester of terephthalic acid of 54.9 wt. % of terephthalic acid, 9.3 wt. % (38 mol %, based on the diol component) of ethylene glycol and 35.8 wt. % (62 mol %, based on the diol component) of cyclohexanedimethanol, having an intrinsic viscosity of 0.74 dl/g (measured in a 1:1 mixture of phenol and tetrachloroethane at 25° C.), was used as the poly- or copolycondensate of terephthalic acid.

Production of the Layer Constructions According to the Invention

Example 6

Production of Extruded Films for the Layer (B) without a Laser-Sensitive Additive The installation used consisted of
an extruder with a screw of 105 mm diameter (D) and a length of 41×D. The screw has a devolatilization zone;
a cross head;
a special extrusion slot die 1,500 mm wide;
a triple roll polishing calender with a horizontal roll arrangement, the third roll being swivellable by +/−45° with respect to the horizontal;
a roller conveyor;
equipment for application of protective film on both sides;
a take-off device;
winding station.
The granules were fed to the hopper of the extruder. Melting and conveying of the particular material took place in the particular plasticizing system of barrel/screw. From the die, the melt arrived at the polishing calender. Final shaping and cooling of the material took place on the polishing calender (consisting of three rolls). For embossing of the surfaces, a structured steel roll (6-face) and a structured silicone rubber roll (2-face) were employed. The rubber roll used for structuring the film surface is disclosed in U.S. Pat. No. 4,368,240 of Nauta Roll Corporation. The film was then transported through a take-off and thereafter the film was wound up.
A compound of the following composition was blended:
94 wt. % of polyester from Example 5
4 wt. % of masterbatch from Example 4 and
2 wt. % of masterbatch from Example 3
Films with two structured sides having a layer thickness of 85 μm were extruded from this on the installation described above.

Example 7

Production of Extruded Films for the Layer (B) with a Laser-Sensitive Additive A compound of the following composition was blended:
76 wt. % of polyester from Example 5
18 wt. % of masterbatch from Example 1
4 wt. % of masterbatch from Example 4 and
2 wt. % of masterbatch from Example 3
Films with two structured sides having a layer thickness of 85 μm were extruded from this as described in Example 6, on the same installation.

Example 8

PVC Film for the Layer to be Printed by Means of Dye Diffusion Thermal Transfer Printing (not According to the Invention)

Pentacard CC-M278/01 overlay film of vinyl chloride/vinyl acetate copolymer having a vinyl acetate content of 14.8 wt. % and a vinyl chloride content of 85.2 wt. % and a layer thickness of approx. 30 μm (Klockner Pentaplast).

Example 9

Production of Non-Laserable Identification Documents (ID Cards) which can be Printed by Means of Dye Diffusion Thermal Transfer Printing (According to the Invention)

a) Production of a Prelam:
Film 1-1: Film Having a White Filler Content
A polycarbonate film of thickness 125 μm based on the polycarbonate Makrolon 3108® from Bayer MaterialScience AG and titanium dioxide (Kronos® 2230 from Kronos Titan) as a white pigment filler was produced from the masterbatch from Example 2 by means of extrusion at a melt temperature of approx. 280° C.
Film 1-2: Film Having a White Filler Content
A film having the same composition as film 1-1 of thickness 400 μm was produced.
A layer construction in the form of a so-called prelam was laminated from the abovementioned films as described in the following:
Layer (1): Film 1-1; 125 μm
Layer (2): Film 1-2; 400 μm (layer (A) according to the invention)
Layer (3): Film 1-1; 125 μm
In the above experimental set-up, the layers (1) and (3) were employed in order to ensure a comparable total layer thickness of the laminated card (cf. ISO IEC 7810:2003). A symmetric layer construction of the card was chosen in order to avoid distortion of the card.
For this, in each case a stack in the abovementioned sequence was formed from the films and the lamination was carried out on a lamination press from Bürkle with the following parameters:
  Preheating of the press to 175° C.
  Pressing for 8 minutes under a pressure of 5 bar
  Pressing for 2 minutes under a pressure of 80 bar
  Cooling of the press to 38° C. and opening of the press.
b) Production of an ID Card
Films from Example 6 were laminated under the following conditions on to the prelam produced in this way:
Layer (1): Film from Example 6, 85 μm
Layer (2): Prelam
Layer (3): Film from Example 6, 85 μm
For this, in each case a stack in the abovementioned sequence was formed from the films and the lamination was carried out on a lamination press from Bürkle with the following parameters:
  Preheating of the press to 155° C.
  Pressing for 8 minutes under a pressure of 5 bar
  Pressing for 2 minutes under a pressure of 80 bar
  Cooling of the press to 38° C. and opening of the press.

Example 10

Production of Laserable Identification Documents (ID Cards) which can be Printed by Means of Dye Diffusion Thermal Transfer Printing (According to the Invention)

a) Production of a Prelam:
The same prelam as in Example 9 was produced in the same manner as described in Example 9.

b) Production of an ID Card
The films from Example 7 were laminated under the following conditions on to the prelam produced in this way:
Layer (1): Film from Example 7, 85 μm
Layer (2): Prelam
Layer (3): Film from Example 7, 85 μm
For this, in each case a stack in the abovementioned sequence was formed from the films and the lamination was carried out on a lamination press from Bürkle under the same parameters as in Example 9.

Example 11

Production of Non-Laserable Identification Documents (ID Cards), with a PVC Overlay, which can be Printed by Means of Dye Diffusion Thermal Transfer Printing (not According to the Invention)

a) Production of a Prelam:
Films 1-1 and 1-2 having a white filler content were produced as described in Example 9.
Film 2: Transparent Film
A polycarbonate film of thickness 50 μm based on the polycarbonate Makrolon 3108® from Bayer MaterialScience AG was produced by means of extrusion at a melt temperature of approx. 280° C.
A layer construction in the form of a so-called prelam was laminated from the abovementioned films as described in the following:
Layer (1): Film 2; 50 μm
Layer (2): Film 1-1; 125 μm
Layer (3): Film 1-2; 400 μm
Layer (4): Film 1-1; 125 μm
Layer (5): Film 2; 50 μm
In the above experimental set-up, the layers (1) and (5) were employed in order to ensure a comparable total layer thickness of the laminated card (cf. ISO IEC 7810:2003). A symmetric layer construction of the card was chosen in order to avoid distortion of the card.
For this, in each case a stack in the abovementioned sequence was formed from the films and the lamination was carried out on a lamination press from Bürkle with the following parameters:
  Preheating of the press to 175° C.
  Pressing for 8 minutes under a pressure of 5 bar
  Pressing for 2 minutes under a pressure of 80 bar
  Cooling of the press to 38° C. and opening of the press.
b) Production of an ID Card
The films from Example 8 were laminated under the following conditions on to the prelam produced in this way:
Layer (1): Film from Example 8, 30 μm
Layer (2): Prelam
Layer (3): Film from Example 8, 30 μm
For this, in each case a stack in the abovementioned sequence was formed from the films and the lamination was carried out on a lamination press from Bürkle with the following parameters:
  Preheating of the press to 155° C.
  Pressing for 8 minutes under a pressure of 5 bar
  Pressing for 2 minutes under a pressure of 80 bar Example 12

Printing of the ID Cards from Examples 9 to 11 by Dye Diffusion Thermal Transfer Printing (D2T2 Printing)

Printing experiments were carried out on the ID cards from Example 9, 10 and 11 on an installation from Nisca PR 5310 with the following parameters:

Printing mode: 4-colour printing
Colour ribbon: YMCKO02
Resolution: 300 dpi (11.8 dots/mm)
Full-area printing of a coloured image The results showed that the contrast, and therefore the image sharpness, and the colour intensity of the coloured images introduced into the ID cards comprising the layer constructions according to the invention by means of D2T2 printing were significantly higher than in the case of the ID card from Comparative Example 11 with the vinyl chloride/vinyl acetate copolymer film to be printed as an overlay film. Not only the coloured parts of the print, but also the black parts of the print showed the significantly batter contrast and the significantly better colour intensity in the ID cards from Examples 9 and 10 comprising the layer constructions according to the invention. The passages printed in black on the ID card from Example 11 were merely grey, whereas these passages on the ID cards from Examples 9 and 10 were an intense black. The coloured passages on the ID cards from Examples 9 and 10 showed a significantly higher colour brilliance and colour intensity, in contrast to the significantly paler colours on the ID card from Example 11. The image furthermore had a high image sharpness on the ID cards from Examples 9 and 10, whereas it was blurred on the ID card from Example 11.

Example 13

Laser Engraving of the Laser-Writable Identification Documents

Laser engraving was carried out on the ID card from Example 10 on a laser installation from Foba with the following parameters:
Laser medium: Nd:YAG
Wavelength: 1064 nm
Power: 40 watt
Current: 30 A
Pulse frequency: 14 kHz
Advance speed: 200 mm/sec.

During the laser engraving, the information was written only on one of the two laser-writable film layers (layer (1)) of the ID card. The complete black-and-white portrait of a woman and a greyscale wedge were written as information into the laser-writable layer by means of laser engraving.

An excellent contrast and very good graduation of the greyscales were to be achieved.

The invention claimed is:

1. A layer construction comprising
at least one layer (A) comprising at least one thermoplastic and
at least one layer (B) comprising at least one poly- or copolycondensate of terephthalic acid or naphthalenedicarboxylic acid,
wherein layer (B) has been produced from a plastics composition comprising at least one poly- or copolycondensate of terephthalic acid or naphthalenedicarboxylic acid and at least one phosphite, wherein the at least one phosphite has a structure $P(OR)_3$, wherein R represents an aliphatic, aromatic and/or cycloaliphatic hydrocarbon radical, wherein the hydrocarbon radical R optionally comprises hetero atoms, and wherein the aromatic hydrocarbon radical optionally comprises further substituents, and wherein the phosphite comprises at least one oxetane group.

2. The layer construction according to claim 1, wherein the plastics composition for the layer (B) comprises at least one poly- or copolycondensate of terephthalic acid or naphthalenedicarboxylic acid, for the preparation of which 1,4-cyclohexanedimethanol has been employed as at least a part of the diol component.

3. The layer construction according to claim 1, wherein the plastics composition for the production of the layer (B) comprises the phosphite to the extent of a content of from 0.005 to 2 wt. %, based on the total weight of the plastics composition for the production of the layer (B).

4. The layer construction according to claim 1, wherein layer (A) comprises at least one thermoplastic selected from the group consisting of polycarbonates or copolycarbonates based on diphenols, poly- or copolyacrylates and poly- or copolymethacrylates, poly- or copolymers with styrene, transparent thermoplastic polyurethanes, polyolefins and poly- or copolycondensates of terephthalic acid or naphthalenedicarboxylic acid.

5. The layer construction according to claim 1, wherein layer (A) is a white or translucent layer.

6. The layer construction according to claim 1, wherein layer (A) is between two layers (B).

7. The layer construction according to claim 1, wherein between layer (A) and the layer(s) (B) the layer construction has at least one further layer comprising at least one thermoplastic.

8. A process for the production of the layer construction according to claim 1, comprising bonding the various films of plastic to one another by lamination or by coextrusion.

9. A security and/or valuable document, wherein the document comprises a layer construction according to claim 1.

10. The security and/or valuable document according to claim 9, wherein the document is an identification document.

11. A method comprising printing the at least one of the layer(s) (B) of the layer construction according to claim 1 by means of dye diffusion thermal transfer printing.

12. A single- or multilayer film of plastic comprising at least one layer comprising at least one poly- or copolycondensate of terephthalic acid or naphthalenedicarboxylic acid, characterized in that this layer has been produced from a plastics composition comprising at least one poly- or copolycondensate of terephthalic acid or naphthalenedicarboxylic acid and at least one phosphite, wherein the at least one phosphite has a structure $P(OR)_3$, wherein R represents an aliphatic, aromatic and/or cycloaliphatic hydrocarbon radical, wherein the hydrocarbon radical R optionally comprises hetero atoms, and wherein the aromatic hydrocarbon radical optionally comprises further substituents, and wherein the phosphite comprises at least one oxetane group.

13. The film of plastic according to claim 12, wherein the film has at least one further layer comprising at least one thermoplastic.

14. The film of plastic according to claim 12, wherein the film has at least one layer (A) comprising at least one thermoplastic and at least two layers (B) produced from a plastics composition comprising at least one poly- or copolycondensate of terephthalic acid or naphthalenedicarboxylic acid and at least one phosphite, and at least one layer (A) is between two layers (B).

* * * * *